(12) United States Patent
Kury

(10) Patent No.: US 12,352,020 B2
(45) Date of Patent: Jul. 8, 2025

(54) SANITARY FITTING

(71) Applicant: Neoperl GmbH, Müllheim (DE)

(72) Inventor: Werner Kury, Müllheim (DE)

(73) Assignee: NEOPERL GMBH, Mullheim (DE)

( * ) Notice: Subject to any disclaimer, the term of this patent is extended or adjusted under 35 U.S.C. 154(b) by 421 days.

(21) Appl. No.: 17/779,745

(22) PCT Filed: Nov. 26, 2020

(86) PCT No.: PCT/EP2020/083542
§ 371 (c)(1),
(2) Date: May 25, 2022

(87) PCT Pub. No.: WO2021/105302
PCT Pub. Date: Jun. 3, 2021

(65) Prior Publication Data
US 2023/0003006 A1    Jan. 5, 2023

(30) Foreign Application Priority Data
Nov. 29, 2019 (DE) .......................... 202019106666.0

(51) Int. Cl.
*F16L 39/02* (2006.01)
*E03C 1/04* (2006.01)
(Continued)

(52) U.S. Cl.
CPC .......... *E03C 1/0403* (2013.01); *F16K 11/078* (2013.01); *F16L 39/02* (2013.01); *F16L 39/04* (2013.01); *F16L 41/08* (2013.01)

(58) Field of Classification Search
CPC ......... F16L 33/28; F16L 33/03; F16L 33/035; F16L 39/02; F16L 39/04; F16L 41/08;
(Continued)

(56) References Cited

U.S. PATENT DOCUMENTS

| 4,493,340 A * | 1/1985 | Weirich | ................. F16L 29/02 137/594 |
| 2004/0061334 A1* | 4/2004 | Kruck | ................. E03C 1/0403 285/376 |
| 2018/0209571 A1 | 7/2018 | Stein et al. | |

FOREIGN PATENT DOCUMENTS

| CN | 1496285 A | 5/2004 |
| CN | 1815134 A | 8/2006 |

(Continued)

*Primary Examiner* — Hailey K. Do
(74) *Attorney, Agent, or Firm* — Volpe Koenig

(57) ABSTRACT

A sanitary fitting (100) including a fitting housing (102) having a housing interior (103) into which a cartridge (106) or a cartridge adapter having a cartridge provided in a cartridge receptacle (105) is inserted, which cartridge has at least one inlet opening connected to at least one outlet opening of the cartridge (106) to conduct fluid through the cartridge (106). The fitting includes—at least one hose line (108) for supplying the fluid to the cartridge (106), which hose line has, at least at the end close to the cartridge, a hose connection element (109). The hose connection element (109) is securely held in a retaining position on the cartridge (106) or on the cartridge adapter, to prevent removal, and the free end of this element that encircles a hose opening (111) lies against the edge region of the cartridge (106) that encircles the associated inlet opening.

18 Claims, 12 Drawing Sheets

(51) Int. Cl.
*F16K 11/078* (2006.01)
*F16L 39/04* (2006.01)
*F16L 41/08* (2006.01)

(58) Field of Classification Search
CPC .. E03C 1/0403; F16K 11/078; F16K 11/0782; F16K 11/0787
See application file for complete search history.

(56) References Cited

FOREIGN PATENT DOCUMENTS

| | | | |
|---|---|---|---|
| CN | 106461109 B | 2/2017 | |
| CN | 209041741 | 6/2019 | |
| DE | 3119313 | 12/1982 | |
| DE | 19527985 | 2/1997 | |
| DE | 10234206 | 1/2004 | |
| DE | 202017100423 | 6/2018 | |
| EP | 1435480 | 7/2004 | |
| EP | 1457607 | 9/2004 | |
| EP | 1496164 | 1/2005 | |
| EP | 1798348 | 6/2007 | |
| EP | 2220297 B1 | 8/2011 | |
| EP | 2995838 | 3/2016 | |
| EP | 3591127 A1 * | 1/2020 | ........... E03C 1/0403 |
| TW | 201516302 A | 5/2015 | |
| WO | 2009065435 | 5/2009 | |
| WO | 2019002515 | 1/2019 | |

\* cited by examiner

SANITARY FITTING

TECHNICAL FIELD

The invention relates to a sanitary fitting having a fitting housing which has a housing interior into which a cartridge or a cartridge adapter having a cartridge provided in a cartridge receptacle of the cartridge adapter is inserted, which cartridge has at least one inlet opening which, for the passage of at least one fluid through the cartridge, is connected to at least one outflow opening, and having at least one hose line for carrying the at least one fluid to the cartridge, which hose line has, at least at its hose end next to the cartridge, a hose connection element.

BACKGROUND

Sanitary outflow fittings are used to provide the fluid required at a point of discharge in the desired quality and quantity. The previously known sanitary fittings have, for this purpose, a fitting housing which can be mounted for example on a washbasin that serves as a point of discharge. The fitting housing has a housing interior, into which a cartridge is inserted, with the aid of which the quantity of water or the temperature of the water flowing out of the fitting outflow of the outflow fitting can be adjusted. In the previously known cartridges, ceramic washers are used as shut-off element. These ceramic washers rotate against one another and displace one another, and steplessly release the flow of water. The position of the lever of the single-lever fitting, which corresponds to a particular relative position of the washers with respect to one another, provides the degree of opening of the cartridge.

Thus, sanitary fittings of the type mentioned at the beginning are already known, which have a fitting housing in the form of a hollow body. The fitting housing has a housing interior, into which either a cartridge or a cartridge adapter is inserted, which cartridge adapter contains a cartridge provided in a cartridge receptacle of the cartridge adapter. Since the cartridge having the valve washers is produced as a standardized component, it is possible, with the aid of the cartridge adapter, to adapt the sanitary fitting to the standardized cartridge. In any case, the cartridge has at least one inlet opening which, for carrying at least one fluid through the cartridge, is connected to at least one outflow opening. In the housing interior of the fitting housing, at least one hose line is guided, which serves to carry the at least one fluid to the cartridge. This hose line has a hose connection element at least at its hose end remote from the cartridge. Via the hose line and its hose connection element, at least one fluid, in particular cold and/or hot water, is able to be passed through the cartridge from at least one inlet opening of the cartridge to at least one outflow opening, wherein the quantity or at least one property of the fluid, for example its temperature, can be adjusted in the cartridge.

In this case, the at least one fluid is carried to the cartridge of the previously known sanitary fitting via the at least one hose line. This hose line bears with a hose fitting or similar hose connection element of the hose line on the cartridge adapter such that the fluid carried in the at least one hose line can be guided into the cartridge via the hose connection element and the cartridge adapter. For this purpose, at least one hose retainer protrudes in the housing interior of the fitting housing, said hose retainer being integrally formed on the housing inner circumference of the fitting housing. This at least one hose retainer is passed through by at least one introduction opening, through which at least one introduction opening a respective hose line is able to be introduced. At the circumference of the hose connection element, an encircling retaining groove is provided, into which, after the hose line has been threaded into the introduction opening, a circlip, a retaining clip or similar axial securing means is insertable. This axial securing means secures the hose line and its hose connection element against being pulled out of the introduction opening. The hose connection element of the at least one hose line bears on the cartridge adapter in the region of the duct inflow opening of a flow-through duct, which flow-through duct leads to an inflow opening of the cartridge. The incorporation of the introduction openings into the fitting housing, and the sealing between the hose connection element and the cartridge adapter and between the cartridge adapter and the cartridge is associated with considerable effort.

WO 2009/065435 A1 discloses a hose fastening element for a sanitary or kitchen fitting having at least two introduction channels which each extend as far as at least one receiving position at which a collar of a hose nipple is axially fixable to a connection hose, wherein the hose fastening element has an internal recess which is formed from a feed region and the introduction channels, wherein the introduction channels are set at an angle to one another and open into the common feed region.

EP 1 457 607 A2 discloses a device for fastening a line, wherein the device, for fastening the end of a line to a sanitary fitting, contains, in the sanitary fitting, a receptacle for a nipple, which can be pushed into this receptacle.

DE 20 2017 100 423 U1 discloses a hose connection arrangement having a basic body on which at least two hose receptacles are formed, having at least two hoses which are plugged with their respective ends into in each case one of the at least two hose receptacles, wherein a retaining edge is formed on each of the at least two hoses, having a retaining plate in which, corresponding to the at least two hose receptacles, at least two recesses are formed, into which in each case one of the at least two hoses is insertable by way of an insertion movement oriented transversely to a longitudinal direction of the respective hose, such that the associated retaining edge engages over the retaining plate in order to prevent the hoses from being pulled out of the hose receptacles.

EP 1 435 480 A2 discloses a sanitary fitting which contains, in its base, an adapter component which contains a through-channel for a water guide leading to a mixer valve in the sanitary fitting.

WO 2019/002515 A1 discloses a chromatography system and couplings therefor.

EP 1 798 348 A2 discloses a mixer tap which has a tap body on which a water outlet pipe is arranged, wherein a receiving space for an insert piece having a mixer valve cartridge is provided in the tap body.

SUMMARY

Therefore, the object is to create a sanitary fitting of the type mentioned at the beginning, the production of which is associated with much less effort.

This object is achieved, according to the invention, in the case of the sanitary fitting of the type mentioned at the beginning in particular in that the hose connection element of the at least one hose line is retained in a secured manner in a retaining position on the cartridge or on the cartridge adapter so as to prevent the hose line from being pulled off, and bears with its free end face, bordering a hose opening, on the peripheral region, bordering the associated inlet opening, of the cartridge. The sanitary fitting according to the invention has a fitting housing which has a housing interior. Inserted into the cartridge interior of the fitting housing is either a cartridge or a cartridge adapter, in which a cartridge is provided in a cartridge receptacle. The cartridge receptacle of the cartridge adapter is intended for the insertion of a valve cartridge, mixer cartridge or the like. The cartridge has at least one inlet opening, which, for the passage of at least one fluid through the cartridge, is connected to at least one outflow opening. With the aid of the cartridge, the desired fluid can be selected, the required quantity can be adjusted and/or its temperature or similar fluid properties can be determined, for example by adding cold and hot water. In this case, the at least one fluid, which can be for example hot water, cold water, boiling water or carbonated water, i.e. water to which $CO_2$ has been added, is carried to the cartridge in each case by means of a hose line. In order to carry the fluid coming from the at least one hose line to the cartridge, the hose connection element of the at least one hose line is retained in a secured manner in a retaining position on the cartridge or on the cartridge adapter so as to prevent the hose line from being pulled off. In this case, the hose connection element bears in a liquid-tight manner with its free end face, bordering a hose opening, on the peripheral region, bordering the associated inlet opening, of the cartridge. Since the hose connection element of the at least one hose line is retained in a secured manner in the retaining position on the cartridge or cartridge adapter so as to prevent the hose line from being pulled off, the hose connection element cannot unintentionally be pulled off the cartridge or the cartridge adapter. In the sanitary fitting according to the invention, the hose line is thus retained with its hose connection element on the cartridge or on the cartridge adapter and not on the fitting housing. This already simplifies the production of the fitting housing. Since the at least one hose line bears in a liquid-tight manner with the free end face, bordering a hose opening, of its hose connection element on the peripheral region, bordering an inlet opening, of the cartridge, it is possible to dispense with a further ring seal between the hose line and the cartridge adapter, thereby reducing the production complexity. If the sanitary fitting even requires a cartridge adapter, this cartridge adapter is passed through only by the hose line and long and optionally also crossing flow-through ducts do not need to be provided in the cartridge adapter. Since the at least one hose line bears in a liquid-tight manner on the cartridge, the cartridge adapter can be designed with a reduced installation length or it is possible to dispense with the cartridge adapter entirely, thereby entailing a saving of material both in relation to the cartridge adapter and in relation to the fitting housing that receives the cartridge adapter or the cartridge.

In a particularly advantageous development according to the invention, a passage opening is provided in the cartridge adapter or in the cartridge, a plug-in slot opens into the passage opening, said plug-in slot being formed so as to be open transversely toward the longitudinal axis of the cartridge adapter or of the cartridge at a plug-in opening, the at least one passage opening is assigned a hose-connection-element receptacle which has a receiving shoulder, bordering the passage opening, or a receiving bevel, and the hose line assigned to the passage opening is able to be introduced into the passage opening through the plug-in opening via the plug-in slot such that the hose connection element bears on the receiving shoulder or on the receiving bevel in a secured manner by way of a cross-sectional expansion so as to prevent the hose line from being pulled off. In order for it thus to be possible to fasten the at least one hose line to the cartridge adapter or the cartridge in a secured manner so as to be prevented from being pulled out of the passage opening provided in the cartridge adapter or in the cartridge, the hose connection element is passed through the plug-in opening into the plug-in slot arranged transversely to the longitudinal axis of the cartridge adapter or of the cartridge, in order to be transferred from there into the passage opening. In this passage opening, a receiving shoulder or a receiving bevel is provided. Thus, the at least one hose line assigned to the passage opening can be introduced into the passage opening through the plug-in opening via the plug-in slot such that the hose connection element bears on the receiving shoulder or on the receiving bevel in a secured manner by way of a cross-sectional expansion so as to prevent the hose line from being pulled off. The at least one hose line is thus introduced into the plug-in slot from the plug-in opening formed so as to be open transversely toward the longitudinal axis of the cartridge adapter or of the cartridge, said plug-in slot opening into the passage opening on its side remote from the plug-in opening. This passage opening is assigned the hose-connection-element receptacle in the cartridge adapter or in the cartridge, which has a receiving shoulder, bordering this passage opening, or a receiving bevel. The hose line introduced into the plug-in slot through the plug-in opening can thus be introduced into the assigned passage opening from the plug-in opening located on the inside or provided at the circumference of the cartridge adapter or of the cartridge such that the hose connection element, passing through the passage opening, of this at least one hose line bears on the receiving shoulder or on the receiving bevel in a secured manner by way of a cross-sectional expansion so as to prevent the hose line from being pulled off the cartridge or the cartridge adapter.

In this embodiment, to be designed to be relatively space-saving, according to the invention, the hose line is secured effectively against being unintentionally pulled off in the direction away from the cartridge or the cartridge adapter.

In a further proposal for achieving the object set out above, in a sanitary fitting of the type mentioned at the beginning, in which the hose connection element of the at least one hose line passes, in a retaining position, through a passage opening in the fitting housing, a plug-in slot opens into the at least one passage opening, said plug-in slot having, in a slot subregion or at a slot end spaced apart from the passage opening, a plug-in opening which has a larger opening cross section compared with the passage opening and/or is peripherally open, the at least one passage opening is assigned a hose-connection-element receptacle which has a receiving shoulder bordering the passage opening or a receiving bevel, and the hose line assigned to the passage opening is able to be introduced into the passage opening through the plug-in opening via the plug-in slot such that the hose connection element is retained on the receiving shoulder or on the receiving bevel in a secured manner by way of a cross-sectional expansion so as to prevent the hose line from being pulled off and bears with its free end face, bordering the hose opening, on the peripheral region, bordering the associated inlet opening, of the cartridge or of the cartridge adapter. The sanitary fitting configured according to this proposal of the invention also has a fitting housing which has a housing interior into which a cartridge or a cartridge adapter having a cartridge in a cartridge receptacle is inserted in an insertion direction as far as an insertion stop. This cartridge adapter has a cartridge receptacle which is intended for the insertion of a cartridge. At least one fluid is guided through the cartridge, said fluid flowing through the cartridge from at least one inlet opening to at least one outflow opening. With the aid of the cartridge, the desired fluid can be selected, the required quantity can be adjusted and/or its temperature or similar fluid properties can be determined, for example by adding cold and hot water. In this case, the at least one fluid is carried to the cartridge in each case by means of a hose line. In order to allow the fluid coming from the hose line to flow into the cartridge, which is optionally also located in a cartridge adapter, the at least one hose line bears on the cartridge adapter or on the cartridge with its hose connection element. In this case, the hose connection element of the at least one hose line passes, in a retaining position, through a passage opening which is provided in the fitting housing in the sanitary fitting according to this proposal of the invention. A plug-in slot opens into the at least one passage opening, said plug-in slot having, in a slot subregion or at a slot end spaced apart from the passage opening, a plug-in opening. This plug-in opening can have a larger opening cross section compared with the passage opening and additionally or alternatively be peripherally open. If the plug-in opening is, by contrast, formed in a closed manner and has only an opening cross section that is larger compared with the passage opening, this plug-in opening, the passage opening and the plug-in slot connecting to the two openings together are formed in a keyhole-shaped manner. The at least one passage opening is assigned a hose-connection-element receptacle which has a receiving shoulder bordering the passage opening or a receiving bevel. In this case, the hose line assigned to the passage opening is able to be introduced into the passage opening through the plug-in opening via the plug-in slot such that the hose connection element bears on the receiving shoulder or on the receiving bevel in a secured manner counter to the plugging direction by way of a cross-sectional expansion.

In order to form the at least one passage opening in the fitting housing, it is advantageous when at least one retaining flange protrudes into the housing interior from the housing inner circumference of the fitting housing, which retaining flange has at least one of the passage openings and the plug-in slot, assigned thereto, with a plug-in opening.

In this case, the cross-sectional expansion can be formed as an annular shoulder or as an annular flange on the hose connection element of at least one hose line.

In order also to secure the hose connection element retained on the cartridge adapter or on the cartridge against being unintentionally displaced in the region of the passage opening and in order to retain the hose connection element of the at least one hose line in the desired position on the cartridge adapter or on the cartridge, it is advantageous when the annular flange or similar cross-sectional expansion is dimensionally adapted with its outer contour to the clear cross section of the hose-connection-element receptacle.

In this case, in a preferred embodiment according to the invention, the hose connection element is retained on the cartridge, on the cartridge adapter or on the retaining flange such that the end face, remote from the hose line, of the annular flange is arranged approximately in or beneath the plane formed by the inner side of the cartridge, of the cartridge adapter or of the retaining flange.

By contrast, in another advantageous embodiment according to the invention, the hose connection element is formed in a spherical or drop-shaped manner at its free end. If the free end, bearing on an associated inlet opening of the cartridge, of the hose connection element is spherical or drop-shaped, certain misalignments of the hose connection element or manufacturing tolerances can be compensated in this joint-ball-like region between the hose connection element, for the one part, and the region, bordering the inlet opening, of the cartridge, for the other part.

Such compensation of misalignments or manufacturing tolerances is made even easier when the receiving bevel is in the form of a spherical cap in order to receive the spherical or drop-shaped hose connection element. In this way, the hose connection element, for the one part, and the receiving bevel of the hose-connection-element receptacle can cooperate in a ball-joint-like manner in the region of the passage opening.

In order for it to be possible to connect the hose opening, bordered by the hose connection element, for the one part, and the associated inlet opening on the cartridge, for the other part, together and in order to avoid unintentional leaks in this region of the sanitary fitting, it is advantageous when the hose connection element and the adjacent inlet opening of the cartridge are sealed off by means of a ring seal.

In this case, the position of the ring seal can be fixed in a simple manner when this ring seal passes regionally into the associated hose-connection-element receptacle such that the ring seal is secured in the hose-connection-element receptacle.

If fluids having different fluid properties are intended to withdrawn from the sanitary fitting according to the invention, and if either boiling water or carbonated water is intended to be withdrawn from the sanitary fitting according to the invention in addition to hot and cold water, it is advantageous when at least two hose lines are retained on the cartridge, on the cartridge adapter or on the fitting housing.

In order to configure the liquid passage between the hose connection element, for the one part, and the cartridge, for the other part, in a liquid-tight manner toward the outside, and in order to avoid leakage flows in the connection region between the hose connection element and the adjacent inlet opening of the cartridge, it may be advantageous when the hose connection element and the adjacent inlet opening of the cartridge are sealed off radially and/or axially by means of a ring seal.

Axial sealing between the hose connection element and the adjacent cartridge can be brought about in a simple manner when a sealing ring in the form of a ring seal is clamped in place between the free end face, bordering the hose opening, of the hose connection element and the adjacent peripheral region, bordering the associated inlet opening, of the cartridge. In this embodiment, the free end face of the hose connection element bears, with the aid of the sealing ring, on the adjacent peripheral region, bordering the associated inlet opening, of the cartridge.

In order additionally or alternatively to establish radial sealing between the hose connection element and the adjacent peripheral region, bordering the associated inlet opening, of the cartridge, in a further advantageous exemplary embodiment of the invention, the cartridge has a receiving cavity in the form of a hose-connection-element receptacle, and the ring seal is provided between the hose connection element, for the one part, and the circumferential wall, bordering the receiving cavity, of the cartridge, for the other part.

BRIEF DESCRIPTION OF THE DRAWINGS

Developments according to the invention will become apparent from the following description of the figures in conjunction with the claims and the drawing. The invention is described below in more detail on the basis of preferred exemplary embodiments.

In the figures.

DETAILED DESCRIPTION

Figure 10:
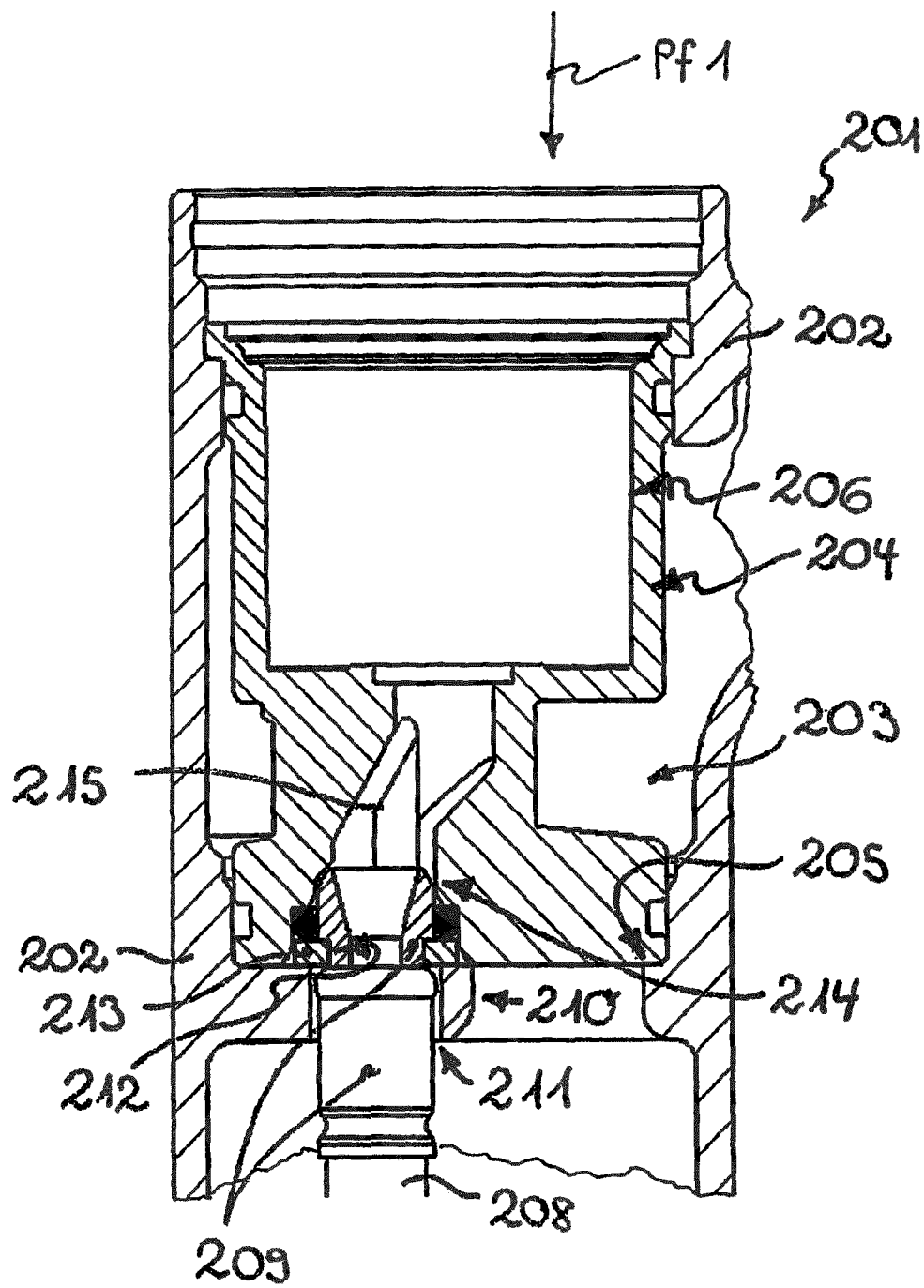
FIG. 10 shows a fitting housing according to the prior art, wherein a cartridge adapter has been inserted into the housing interior of the fitting housing, said cartridge adapter connecting a hose connection element, retained on the fitting housing, of a hose line to a cartridge which is insertable into a cartridge receptacle of the cartridge adapter.
Figure 11:
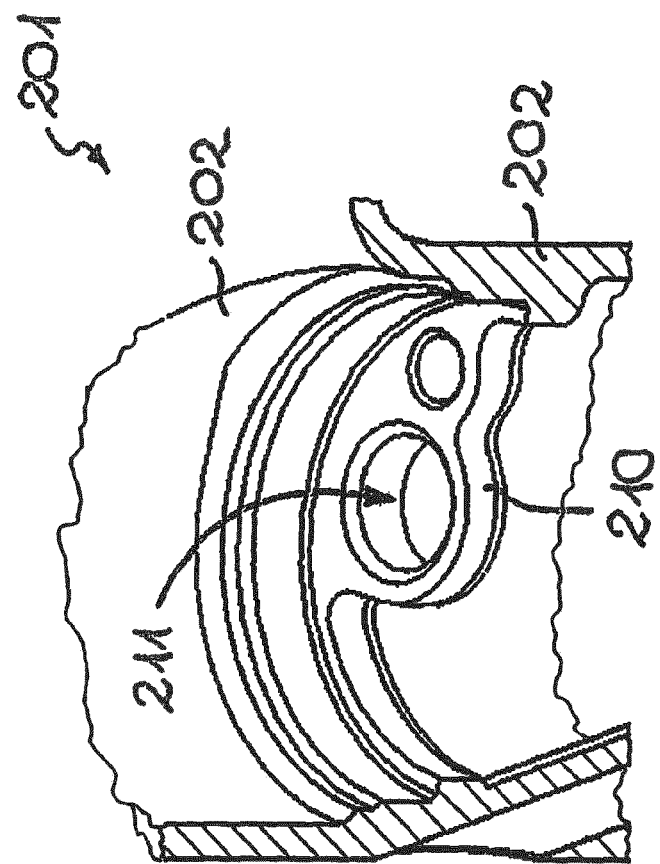
FIG. 11 shows the fitting housing according to the prior art in a detail view in longitudinal section in the region of a hose retainer protruding radially into the housing interior of the fitting housing.

FIGS. 10 and 11 illustrate a sanitary fitting 201 according to the previously known generic prior art. The sanitary fitting 201 previously known from the prior art has a fitting housing 202 in the form of a hollow body, into the housing interior 203 of which a cartridge adapter 204 has been inserted in an insertion direction Pf1 as far as an insertion stop 205. The cartridge adapter 204 has a cartridge receptacle 206 in the form of a blind hole, which is intended for the insertion of a cartridge that is not illustrated in more detail here. Through the cartridge, at least one fluid, in particular cold and/or hot water, is able to be passed from at least one inlet opening of the cartridge to at least one outflow opening, wherein the quantity or at least one property of the fluid, for example its temperature, can be adjusted in the cartridge.

In this case, the at least one fluid is carried to the cartridge of the previously known sanitary fitting via at least one hose line 208. This hose line 208 bears on the cartridge adapter 204 with a hose connection element 209 of the hose line 208 such that the fluid carried in the at least one hose line 208 can be conducted into the cartridge via the hose connection element 209 and the cartridge adapter 204. To this end, at least one hose retainer 210 protrudes in the housing interior 203 of the fitting housing 202, said hose retainer 210 being integrally formed on the housing inner circumference of the fitting housing 202. This at least one hose retainer 210 is passed through by at least one introduction opening 211, through which in each case one hose line 208 is able to be introduced. Provided at the circumference of the hose connection element 209 is an encircling retaining groove 212, into which, after the hose line 208 has been threaded into the introduction opening 211, a circlip, a retaining clip 213 or similar axial securing means is insertable. This axial securing means secures the hose line 208 and its hose connection element 209 against being pulled out of the introduction opening 211. The hose connection element 209 of the at least one hose line 208 bears on the cartridge adapter 204 in the region of the duct inlet opening 214 of a flow-through duct 215, which flow-through duct 215 leads to an inlet opening of the cartridge. The incorporation of the introduction openings 211 into the fitting housing 202 and the sealing between the hose connection element 209 and the cartridge adapter 204 and between the cartridge adapter 204 and the cartridge is associated with considerable effort.

FIGS. 1 to 5, 6, 7 to 9 and 12 illustrate substantially three different embodiments 100, 101 and 601 of a sanitary fitting according to the invention and individual constituents thereof. The sanitary fittings 100, 101 and 601 have a fitting housing 102, 602, illustrated in FIGS. 1, 6, 7 to 9 and 12, which has a housing interior 103, 603. While, in the sanitary fitting 100 according to FIG. 6, the cartridge 106 has been inserted directly into the housing interior 103 in the insertion direction Pf1 as far as an insertion stop, a cartridge adapter 104, 604 has been inserted into the housing interior 103, 603 of the sanitary fittings 101, 601, said cartridge adapter 104, 604 having a cartridge receptacle 105 for the insertion of a cartridge 106. Through the cartridge 106, at least one fluid, which may be for example hot water, cold water, boiling water and/or carbonated water, is able to be passed from at least one inlet opening to at least one outflow opening of the cartridge 106. In this case, the at least one fluid flowing through the cartridge can be adjusted for example in terms of the required quantity and/or in terms of particular fluid properties. To this end, valve washers 620, 621 or other adjusting elements can be provided in the cartridge 106, these being able to be operated by means of an actuating pin that protrudes from the cartridge 106 and is able to be actuated for example by means of a handle, which is not shown in more detail.

It is clear from FIGS. 1, 6, 7 to 9 and 12 that the at least one fluid is carried to the cartridge 106 via at least one flexible hose line 108, 608. This at least one hose line 108, 608 bears on the cartridge 106 or on the cartridge adapter 104, 604 in a liquid-tight manner with a hose connection element 109, 609 of the hose line 108, 608.

Figure 1:
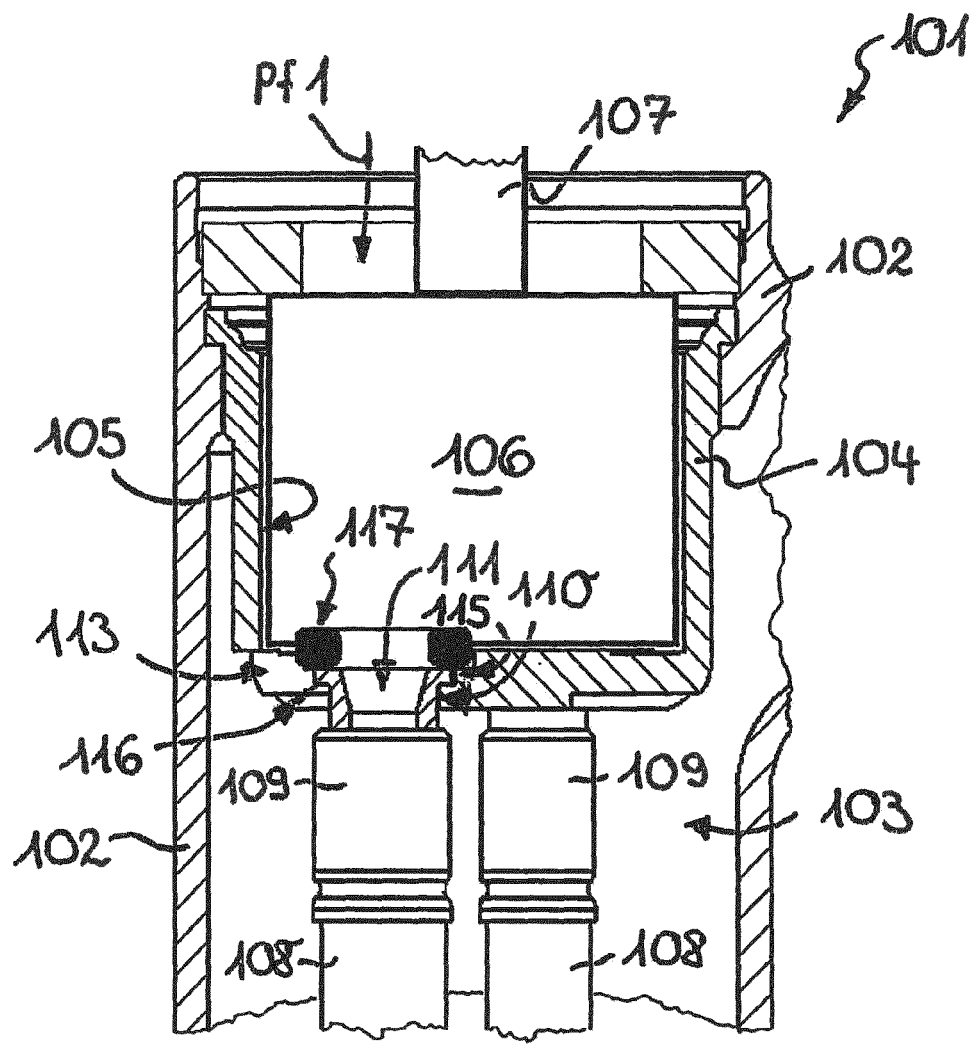
FIG. 1 shows the fitting housing of a sanitary fitting in longitudinal section in the region of a cartridge, wherein the cartridge has been inserted into a cartridge adapter located in the fitting housing, on which cartridge adapter at least two hose lines are retained.
Figure 2:
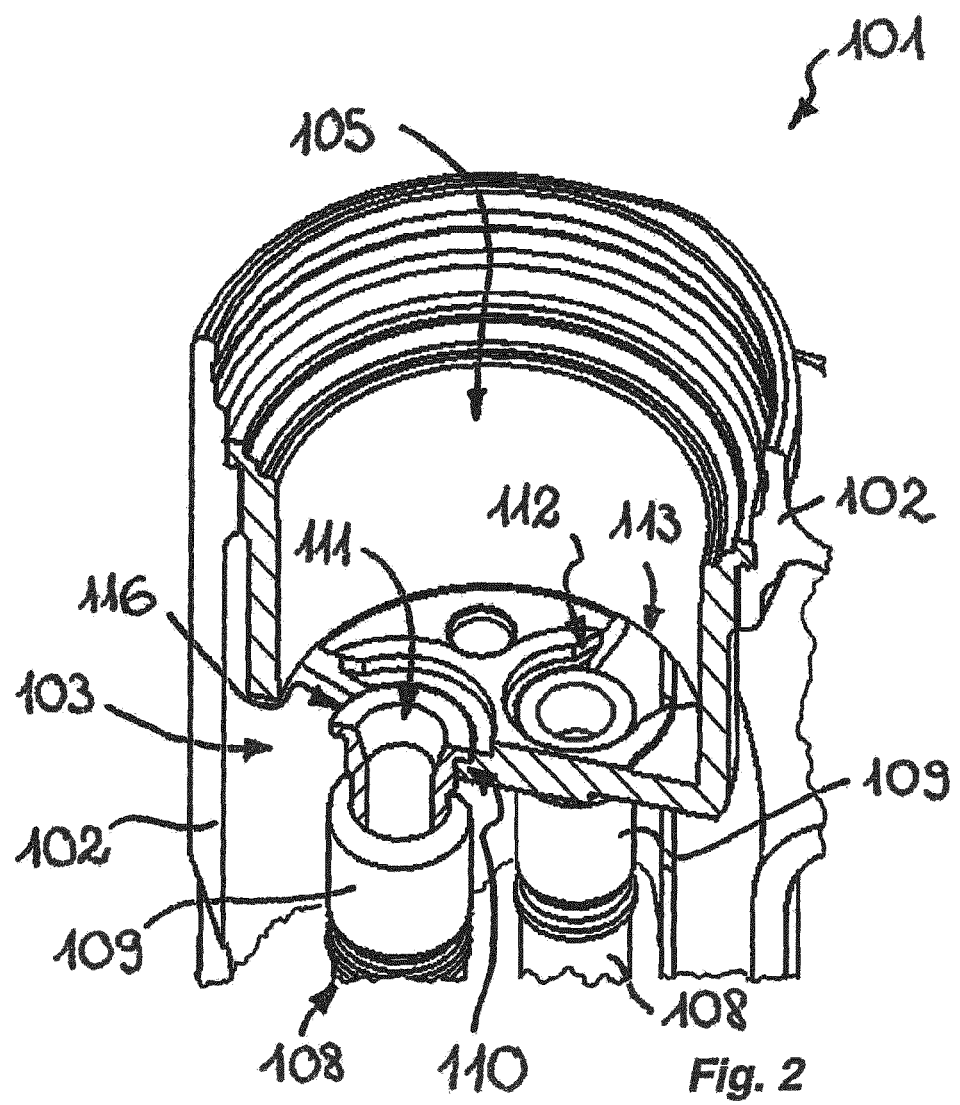
FIG. 2 shows the fitting housing already shown in FIG. 1 in a perspective illustration in longitudinal section, looking at the cartridge receptacle, freed of the cartridge, of the cartridge adapter.
Figure 3:
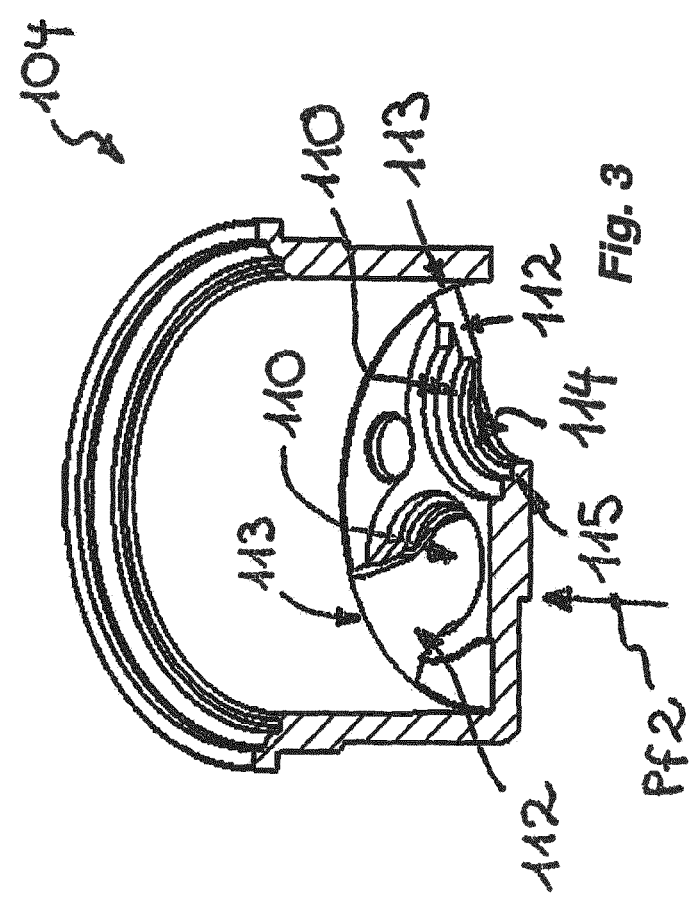
FIG. 3 shows the cartridge adapter from FIGS. 1 and 2 in a perspective illustration in longitudinal section.
Figure 4:
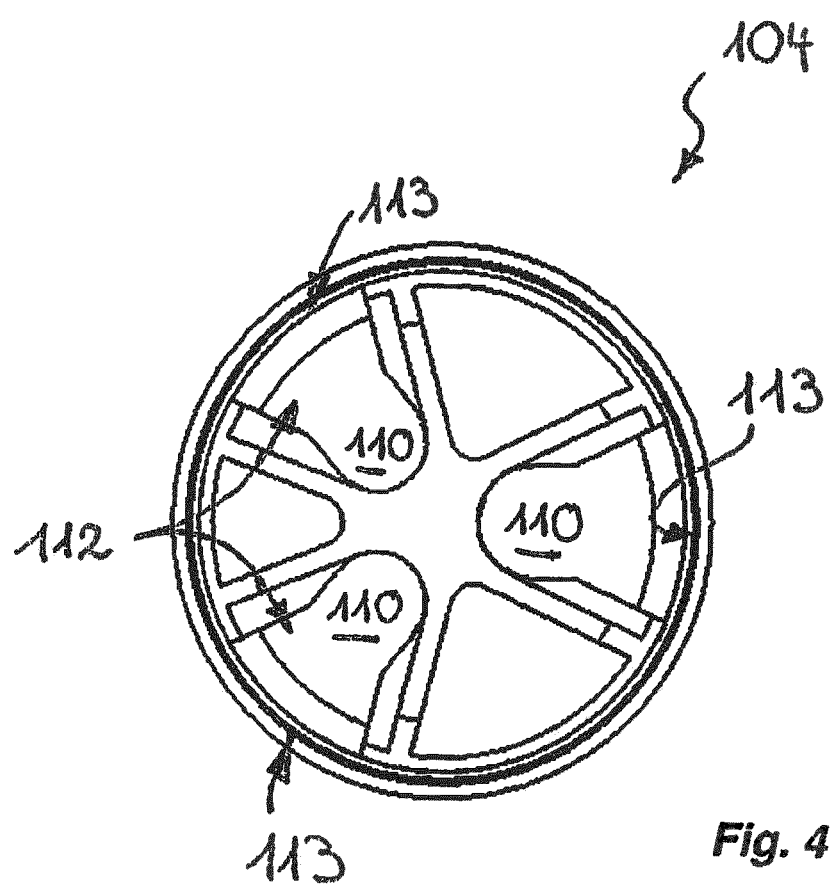
FIG. 4 shows the cartridge adapter from FIGS. 1 to 3 in a plan view of the cartridge receptacle thereof.
Figure 5:
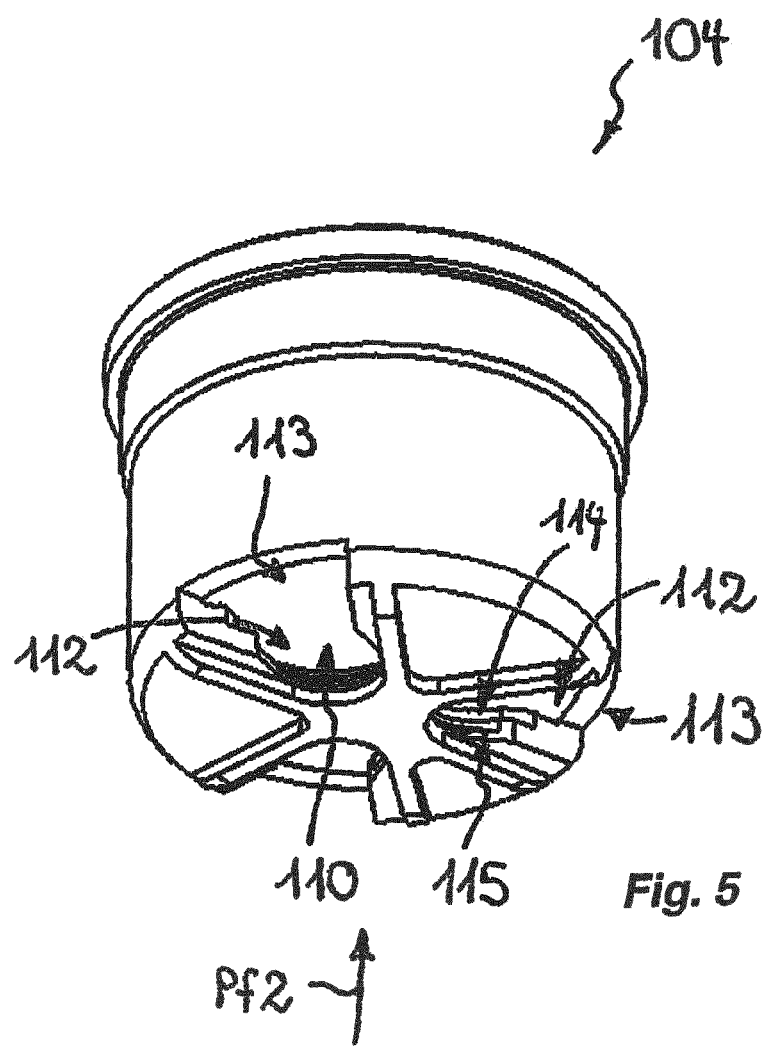
FIG. 5 shows the cartridge adapter from FIGS. 1 to 4 in a perspective illustration looking at the underside, facing away from the cartridge receptacle, of the cartridge adapter.
Figure 6:
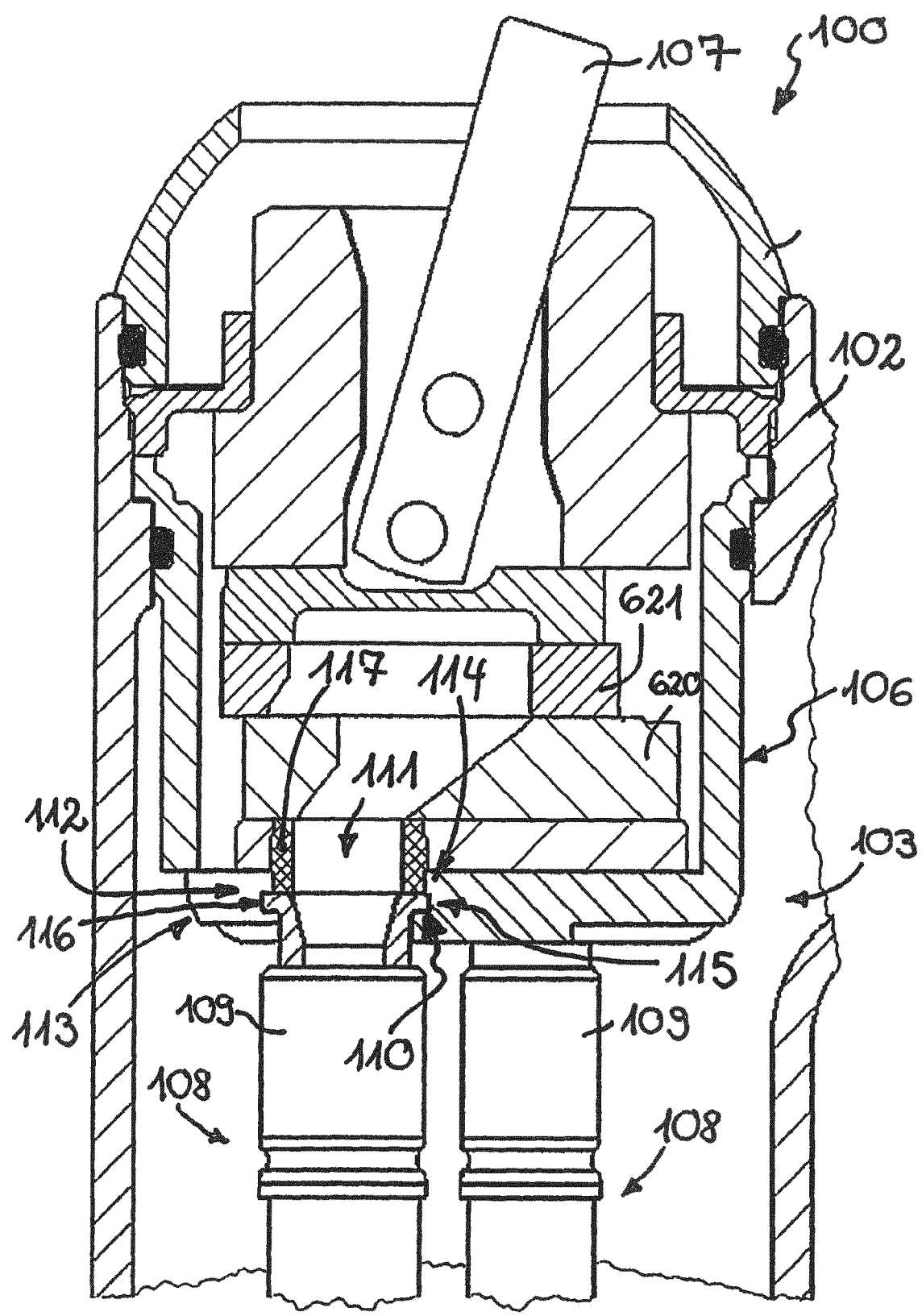
FIG. 6 shows the fitting housing of a further sanitary fitting in longitudinal section in the region of a cartridge which has been inserted into the housing interior of the fitting housing directly and without the aid of a cartridge adapter, wherein at least one hose lines are retained on the cartridge.
Figure 12:
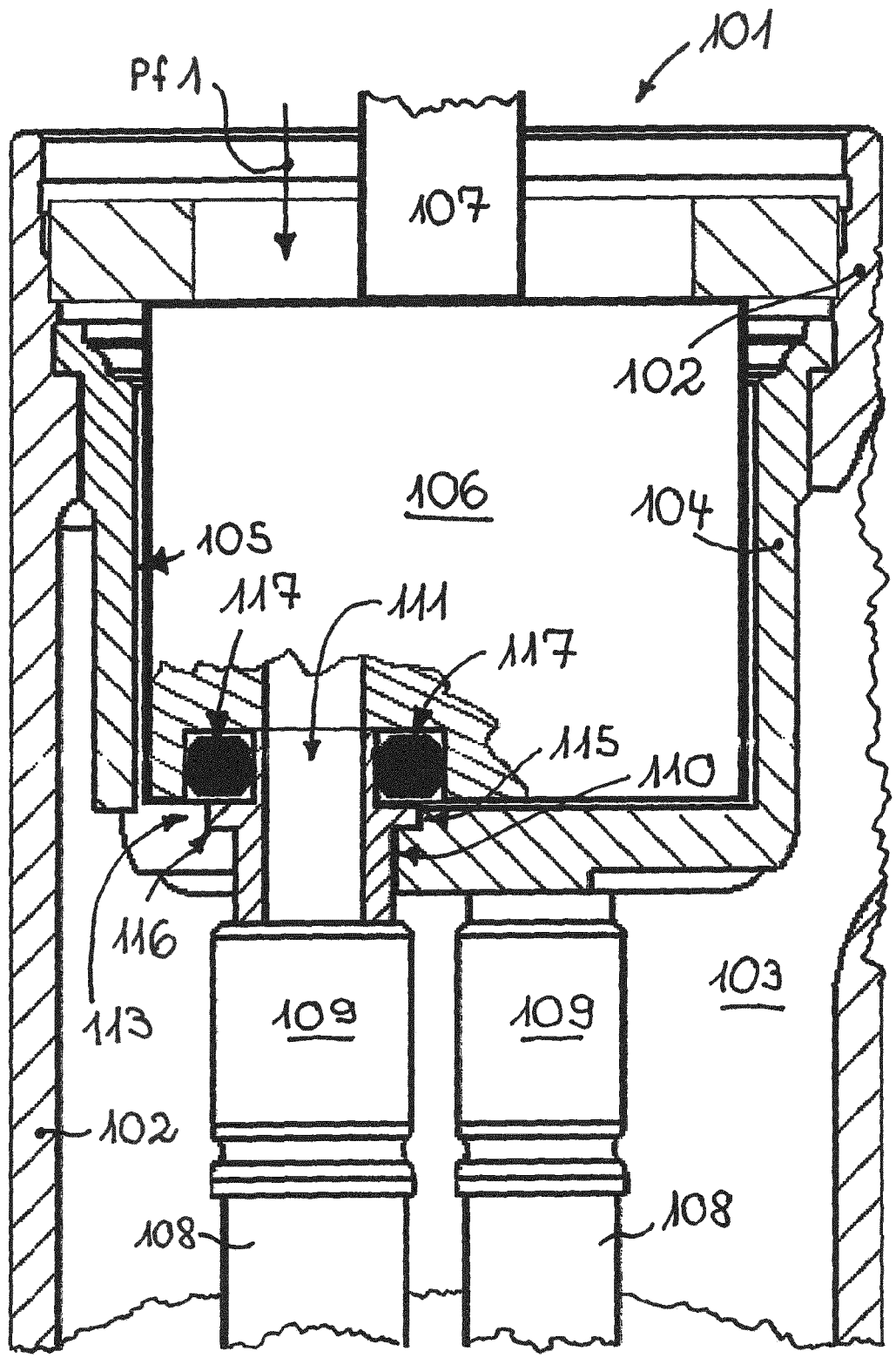
FIG. 12 shows the fitting housing of a sanitary fitting in a further exemplary embodiment in longitudinal section in the region of the cartridge, wherein a ring seal that provides radial sealing is provided between the hose connection element and the circumferential wall of a receiving cavity in the form of a hose-connection-element receptacle of the cartridge.

As is clear from FIGS. 1, 6 and 12, the hose connection element 109 of the at least one hose line 108 passes, in the retaining position illustrated here, through a passage opening 110 in the cartridge 106 (cf. FIG. 6) or in the cartridge adapter 104 (FIG. 1). In this case, the hose connection element 109, retained on the cartridge 106 (cf. FIG. 6) or on the cartridge adapter 104 (cf. FIG. 1), of the sanitary fittings 100, 101 bears in a fluid-tight manner with its free end face, bordering a hose opening 111, optionally by means of ring seal 117 or with a ring seal 117 clamped in place, on the peripheral region, bordering an associated inlet opening, of the cartridge 106, such that the fluid carried along in the hose line 108 can flow into the cartridge 106 via the hose opening 111 and the inlet opening of the cartridge 106, without fear of a leak in the flow between the hose line 108 and the cartridge 106.

In order to prevent the hose line 108 from being unintentionally pulled out of the connection to the cartridge 106 or to the cartridge adapter 104, the hose connection element 109 of the at least one hose line 109 is retained in a secured manner on the cartridge 106 or on the cartridge adapter 104 in the direction Pf2, away from the cartridge 106, through the passage opening 110.

The cartridge adapter 104, illustrated in more detail in FIGS. 1 to 5, 7 to 9 and 12, of the sanitary fitting 101 is in this case configured approximately in a pot-like manner and has, at the bottom of its pot shape, for example three such passage openings 110. In the same way, the cartridge housing of the cartridge 106 shown in FIG. 6 is also configured in a pot-like manner and likewise has three such passage openings 110. It is clear from considering FIGS. 1 to 5, 6 and 7 to 9 in combination that a plug-in slot 112 leads into each of these passage openings 110, said plug-in slot 112 being in this case open toward a plug-in opening 113 arranged externally on the circumference of the cartridge opening 104 or of the cartridge 106. The cartridge adapter 104 configured here in a pot-like manner or the cartridge housing, likewise configured in a pot-like manner, of the cartridge 106 has, at the bottom of its pot shape, for example three such passage openings 110. Each of these passage openings 110 is assigned a hose-connection-element receptacle 114, which has a receiving shoulder 115 bordering the passage opening 110. Thus, the hose line 108 assigned to one of the passage openings 110 can be introduced into the passage opening 110 via the plug-in slot 112 such that the hose connection element 109 bears with a cross-sectional expansion, in the form here of a terminal annular flange 116, on the receiving shoulder 115 in a secured manner counter to the plugging direction Pf2. In order to also secure the hose connection element 109 in its position transversely to the arrow direction Pf2, the annular flange 116 is dimensionally adapted with its outer contour to the clear cross section of the hose-connection-element receptacle 114.

It is clear from FIGS. 1 to 6 that the hose connection element 109 of the at least one hose line 108 is retained on the cartridge 106 or on the cartridge adapter 104 shown in FIGS. 1 to 5 and 7 to 9 such that the end face, remote from the hose line 109, of the annular flange 116 is arranged beneath the plane formed by the inner side of the cartridge housing or of the cartridge adapter 104. In this way, a ring seal 117 can pass for example into the remaining recess of the hose-connection-element receptacle 114 and lateral slippage of the ring seal 117 is prevented. In order that the ring seal 117 can have a sufficiently large ring openings, it is advantageous when the hose-connection-element receptacle 114 has, in the region of the recess accommodating the ring seal 117, a cross-sectional expansion dimensionally adapted to the outer contour of the ring seal 117. The ring seal 117 seals the hose opening 111 in the hose connection element 109, for the one part, and, for the other part, the opposite inlet opening, aligned therewith in the direction of flow, in the cartridge toward the outside.

It is clear from comparing FIGS. 1 and 12 that the hose connection element 109 and the adjacent inlet opening of the cartridge 106 can be sealed radially and/or axially by means of the ring seal 117. It is apparent from FIG. 1 that the ring seal 117, in the form of a sealing ring here, is clamped in place between the free end face, bordering the hose opening 111, of the hose connection element 109 and the adjacent peripheral region, bordering the associated inlet opening, of the cartridge, and seals off the liquid passage axially toward the outside in this region. By contrast, the cartridge 106 in FIG. 12 has a receiving cavity in the form of a hose-connection-element receptacle, wherein the ring seal 117, which seals off the liquid seal radially toward the outside in the exemplary embodiment shown in FIG. 12, is provided between the hose connection element 109 and the circumferential wall, bordering the receiving cavity, of the cartridge 106.

Figure 7:
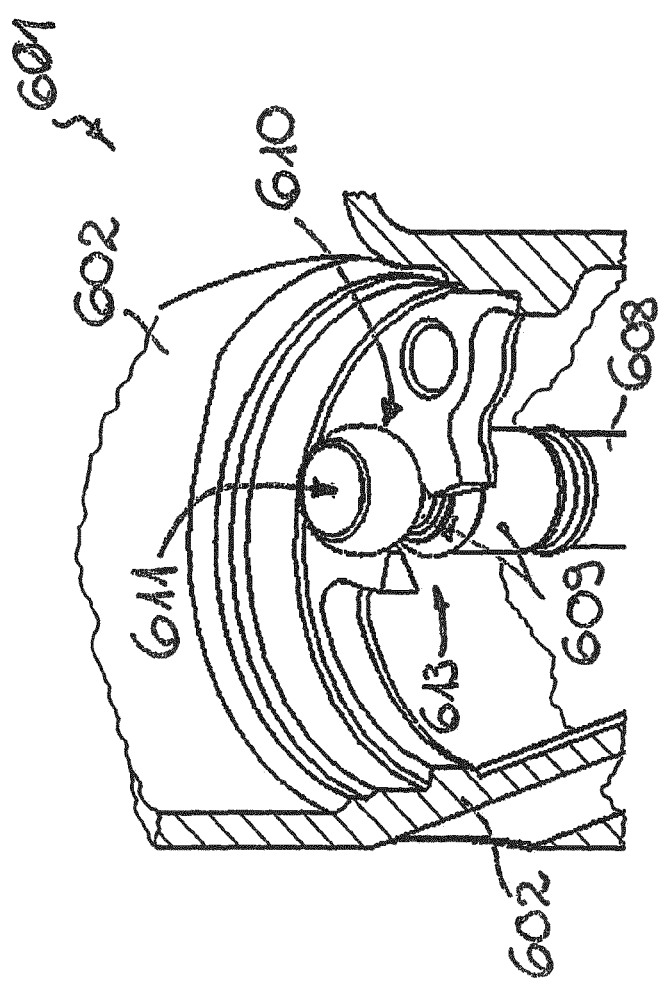
FIG. 7 shows the fitting housing of another outflow fitting in a perspective illustration in longitudinal section, wherein a hose connection element, retained on the fitting housing, of a house line can be seen in FIG. 7.
Figure 8:
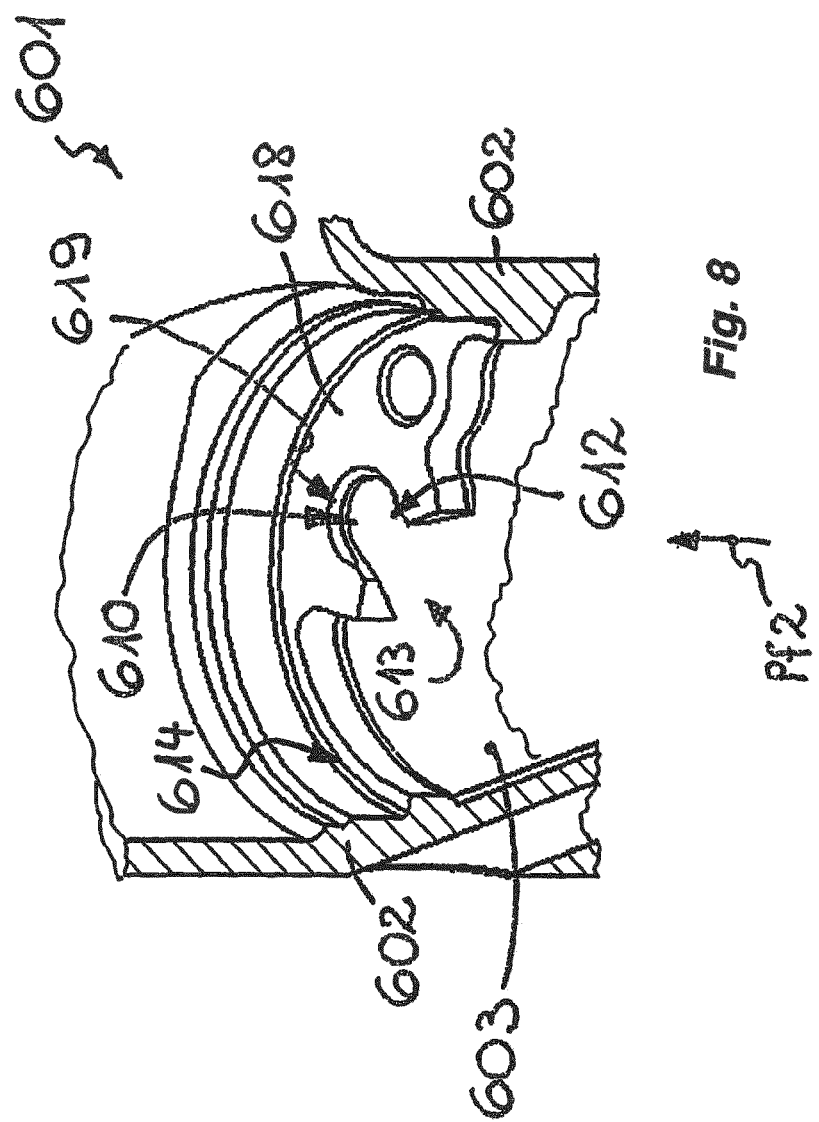
FIG. 8 shows the fitting housing, likewise shown in a perspective illustration in longitudinal section, from FIG. 7 without the hose connection element retained thereon.
Figure 9:
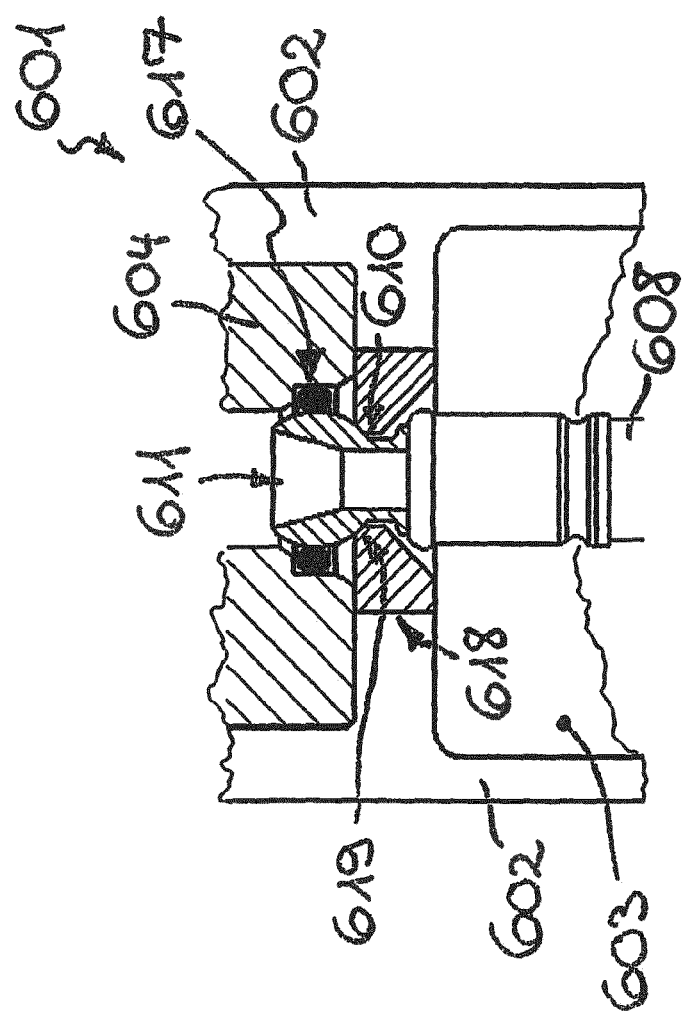
FIG. 9 shows the fitting housing from FIGS. 7 and 8 with the hose connection element retained thereon in a detail illustration in longitudinal section, wherein the hose connection element bears in a fluid-tight manner with its free end face, bordering a hose opening, on the peripheral region, bordering an associated inlet opening, of a cartridge adapter.

The sanitary fitting 601 illustrated in FIGS. 7 to 9 in the region of the housing interior 603, shown in longitudinal section, of its fitting housing 602 has at least one passage opening 610, which is provided in the housing inner circumference of the fitting housing 602. A hose line 608 is likewise retained in this at least one passage opening 610 in a secured manner so as to be prevented from being pulled out of the passage opening 610 counter to the plugging direction Pf2. A plug-in slot 612 opens into the at least one passage opening 610, said plug-in slot 612 having, in a slot subregion or at a slot end spaced apart from the passage opening 610, a plug-in opening 613 which has a larger opening cross section compared with the passage opening 610 and/or—as here—is formed in a peripherally open manner. To this end, at least one retaining flange 618 protrudes into the housing interior from the housing inner circumference of the fitting housing 602, which retaining flange 618 has at least one of the passage openings 610 and the plug-in slot 612, assigned thereto, including the plug-in opening that is open toward the periphery of the retaining flange 618.

The at least one passage opening 610 is assigned a hose-connection-element receptacle 614, which has a receiving shoulder bordering the passage opening 610 or a receiving bevel 619. The hose line 608 assigned to the passage opening 610 can thus be passed into the passage opening 610 through the plug-in opening 613 via the plug-in slot 612 such that the hose connection element 609 bears on the receiving shoulder or—as here—on the receiving bevel 619 of the hose-connection-element receptacle 614 in a secured manner counter to the plugging direction Pf2 by way of a cross-sectional expansion. This cross-sectional expansion, provided at the free end of the hose connection element 609, is in this case spherical or drop-shaped. As a result of this drop-shaped configuration of the cross-sectional expansion provided at the free end of the hose connection element 609 and as a result of the receiving bevel 619 on which the cross-sectional expansion acts, misalignments of the hose connection element 609 and manufacturing tolerances can be compensated. This compensation of misalignments and manufacturing tolerances is facilitated even further when the receiving bevel 618 is in the shape of a spherical cap adapted to the spherical or drop shape of the cross-sectional expansion provided on the hose element 609. In the case of the sanitary fitting 601 illustrated in FIGS. 7 to 9, too, the hose connection element 609 of the at least one hose line 608 and the adjacent inlet opening of the cartridge adapter 604 are sealed by means of a ring seal 617, wherein, here too, the hose connection element 609 bears on the peripheral region, bordering the associated inlet opening, of the cartridge adapter 604 by way of its free end face bordering the hose opening 611.

Preferably at least hose lines 608 are also retained on the fitting housing 602 of the sanitary fitting 601, said hose lines being assigned to different fluids, for example fold water, hot water, boiling water or carbonated water.

LIST OF REFERENCE SIGNS

100 Sanitary fitting according to FIG. 6
101 Sanitary fitting according to FIGS. 1 to 5
102 Fitting housing
103 Housing interior
104 Cartridge adapter
105 Cartridge receptacle
106 Cartridge
107 Actuating pin
108 Hose line
109 Hose connection element
110 Passage opening
111 Hose opening
112 Plug-in slot
113 Plug-in opening
114 Hose-connection-element receptacle
115 Receiving shoulder
116 Annular flange
117 Ring seal
201 Sanitary fitting according to FIGS. 10 and 11
202 Fitting housing
203 Housing interior
204 Cartridge adapter
205 Insertion stop
206 Cartridge receptacle
208 Hose line
209 Hose connection element
210 Hose retainer
211 Introduction opening
212 Retaining groove
213 Retaining clip
214 Duct inlet opening
215 Flow-through duct
601 Sanitary fitting according to FIGS. 6 to 8
602 Fitting housing
603 Housing interior
604 Cartridge adapter
608 Hose line
609 Hose connection element
610 Passage opening
611 Hose opening
612 Plug-in slot
613 Plug-in opening
614 Hose-connection-element receptacle
617 Ring seal
618 Retaining flange
619 Receiving bevel
620 Valve washer
621 Valve washer
Pf1 Insertion direction
Pf2 Passage direction

The invention claimed is:

1. A sanitary fitting (100, 101, 601) comprising:
a fitting housing (102, 602) which has a housing interior (103, 603) configured to receive a cartridge (106) or a cartridge adapter (104, 604) having a cartridge receptacle (105) configured to receive the cartridge (106),
the cartridge (106) has at least one inflow opening which, for passage of at least one fluid through the cartridge (106), is connected to at least one outflow opening of the cartridge (106),
at least one hose line (108, 608) for carrying the at least one fluid to the cartridge (106), the at least one hose line (108, 608) has, at least at a hose end thereof next to the cartridge (106), a hose connection element (109, 609),
the hose connection element (109, 609) of the at least one hose line (108, 608) is retained in a secured manner in a retaining position on the cartridge (106) or on the cartridge adapter (104, 604) so as to prevent the at least one hose line (108, 608) from being pulled off, and bears with a free end face of the hose connection element (109, 609), bordering a hose opening (111), on a peripheral region, bordering the at least one inflow opening, of the cartridge (106)
wherein a cross-sectional expansion is provided at a free end of the hose connection element (609), and wherein the cross-sectional expansion is spherical or drop-shaped.

2. The sanitary fitting (100, 101, 601) as claimed in claim 1, wherein the at least one hose line (108, 608) comprises at least two hose lines (108, 608) that are retained on the cartridge (106), on the cartridge adapter (104) or on the fitting housing (602).

3. The sanitary fitting (100, 101, 601) as claimed in claim 1, wherein the hose connection element (109) and an adjacent one of the at least one inflow opening of the cartridge (106) are sealed off at least one of radially or axially by a ring seal (117).

4. The sanitary fitting (601) as claimed in claim 1, wherein the passage opening (110) is assigned a hose-connection-element receptacle (114) which has a receiving bevel (619) in a form of a spherical cap adapted to receive the hose connection element (609).

5. The sanitary fitting (100, 101, 601) as claimed in claim 1, wherein the hose connection element (109, 609) and an adjacent one of the at least one inflow opening of the cartridge (106) are sealed off by a ring seal (117, 617).

6. The sanitary fitting (101) as claimed in claim 5, wherein the ring seal (117) passes regionally into a hose-connection-element receptacle (114) such that the ring seal (117) is secured in the hose-connection-element receptacle (114).

7. The sanitary fitting (100, 101) as claimed in claim 1, further comprising:
a passage opening (110) in the cartridge adapter (104, 604) or in the cartridge (106),
a plug-in slot (112) opens into the passage opening (110), said plug-in slot (112) being formed to open transversely toward a longitudinal axis of the cartridge adapter (104, 604) or of the cartridge (106) at a plug-in opening (113),
the passage opening (110) is assigned a hose-connection-element receptacle (114) which has a receiving shoulder (115) or a receiving bevel (619), wherein the receiving shoulder (115) borders the passage opening (110), and
the at least one hose line (108) assigned to the passage opening (110) is introducible into the passage opening (110) through the plug-in opening (113) via the plug-in slot (112) such that the hose connection element (109) bears on the receiving shoulder (115) or on the receiving bevel (619) in a secured manner via a cross-sectional expansion to prevent the at least one hose line from being pulled off.

8. The sanitary fitting (100, 101) as claimed in claim 7, wherein the cross-sectional expansion is formed on the hose connection element (109) as an annular shoulder or as an annular flange (116).

9. The sanitary fitting (100, 101) as claimed in claim 8, wherein the annular shoulder or the annular flange (116) is dimensionally adapted with an outer contour thereof to a cross section of the hose-connection-element receptacle (114).

10. The sanitary fitting (100, 101) as claimed in claim 8, wherein the cross-sectional expansion is formed on the hose connection element (109) as the annular flange (116), and wherein the hose connection element (109) of the at least one hose line (108) is retained on the cartridge (106) or on the cartridge adapter (104) such that the free end face, remote from the at least one hose line (108), of the annular flange (116) is arranged approximately in or beneath a plane formed by an inner side of the cartridge (106) or of the cartridge adapter (104).

11. The sanitary fitting (100, 101, 601) as claimed in claim 8, wherein a sealing ring in the form of a ring seal (117) is clamped in place between the free end face, bordering the hose opening, of the hose connection element (109) and the peripheral region, bordering an associated one of the at least one inflow opening, of the cartridge (106).

12. The sanitary fitting (100, 101, 601) as claimed in claim 11, wherein the cartridge (106) has a receiving cavity comprising a hose-connection-element receptacle, and the ring seal (117) is provided between the hose connection element (109) and a circumferential wall, bordering the receiving cavity, of the cartridge (106).

13. A sanitary fitting (601) comprising:
a fitting housing (602) which has a housing interior (603) configured to receive a cartridge (106) or a cartridge adapter (604) having a cartridge receptacle (105) configured to receive the cartridge (106),
the cartridge (106) has at least one inflow opening which, for passage of at least one fluid through the cartridge (106), is connected to at least one outflow opening of the cartridge (106),
at least one hose line (608) for carrying the at least one fluid to the cartridge (106), the at least one hose line (608) has, at least at a hose end thereof next to the cartridge (106), a hose connection element (609),
the hose connection element (609) of the at least one hose line (608) passes, in a retaining position, through a passage opening (610) in the fitting housing (602),
a plug-in slot (612) opens into the passage opening (610), said plug-in slot (612) having, in a slot subregion or at a slot end spaced apart from the passage opening (610), a plug-in opening (613) that at least one of has a larger opening cross section compared with the passage opening (610) or is peripherally open,
the passage opening (610) is assigned a hose-connection-element receptacle (614) which has a receiving shoulder or a receiving bevel (619), wherein the receiving shoulder borders the passage opening (610), and
the at least one hose line (608) assigned to the passage opening (610) is introducible into the passage opening (610) through the plug-in opening (613) via the plug-in slot (612) such that the hose connection element (609) is retained on the receiving shoulder or on the receiving bevel (619) in a secured manner by a cross-sectional expansion so as to prevent the at least one hose line (608) from being pulled off and bears with a free end face of the hose connection element (609), bordering the hose opening, on a peripheral region, bordering associated one of at least one inflow opening, of the cartridge (106) or of the cartridge adapter (604)
wherein the cross-sectional expansion is provided at a free end of the hose connection element (609), and wherein the cross-sectional expansion is spherical or drop-shaped.

14. The sanitary fitting (601) as claimed in claim 13, wherein the hose-connection-element receptacle (114) has the receiving bevel (619), and wherein the receiving bevel (619) is in a form of a spherical cap adapted to receive the hose connection element (609).

15. The sanitary fitting (601) as claimed in claim 13, wherein at least one retaining flange (618) protrudes from a housing inner circumference of the fitting housing (602), the at least one retaining flange (618) the passage opening (610) and the plug-in slot (612).

16. The sanitary fitting (601) as claimed in claim 15, wherein the hose connection element (609) of the at least one hose line (608) is retained on the cartridge (106), on the cartridge adapter (104) or on the at least one retaining flange (618) such that an end face, remote from the at least one hose line (108, 608), of an annular flange (116) is arranged approximately in or beneath a plane formed by an inner side of the cartridge (106), of the cartridge adapter (104), or of the at least one retaining flange (618).

17. A sanitary fitting comprising:
a fitting housing which has a housing interior configured to receive a cartridge or a cartridge adapter having a cartridge receptacle configured to receive the cartridge,
the cartridge has at least one inflow opening which, for passage of at least one fluid through the cartridge, is connected to at least one outflow opening of the cartridge,
at least one hose line for carrying the at least one fluid to the cartridge, the at least one hose line has, at least at a hose end thereof next to the cartridge, a hose connection element,
the hose connection element of the at least one hose line passes, in a retaining position, through a passage opening in the fitting housing,
a plug-in slot opens into the passage opening, said plug-in slot having, in a slot subregion or at a slot end spaced apart from the passage opening, a plug-in opening that at least one of has a larger opening cross section compared with the passage opening or is peripherally open,
the passage opening is assigned a hose-connection-element receptacle which has a receiving bevel, and
the at least one hose line assigned to the passage opening is introducible into the passage opening through the plug-in opening via the plug-in slot such that the hose connection element is retained on the receiving bevel in a secured manner by a cross-sectional expansion so as to prevent the at least one hose line from being pulled off and bears with a free end face of the hose connection element, bordering the hose opening, on a peripheral region, bordering associated one of at least one inflow opening, of the cartridge or of the cartridge adapter,
wherein the cross-sectional expansion is provided at a free end of the hose connection element, and wherein the cross-sectional expansion is spherical or drop-shaped.

18. The sanitary fitting as claimed in claim 17, wherein the receiving bevel is in a form of a spherical cap adapted to receive the hose connection element.

\* \* \* \* \*